Oct. 18, 1927.
H. W. WEATHERS
1,645,634
ATTACHMENT FOR AUTOMOBILE INDICATORS
Filed Aug. 28, 1924
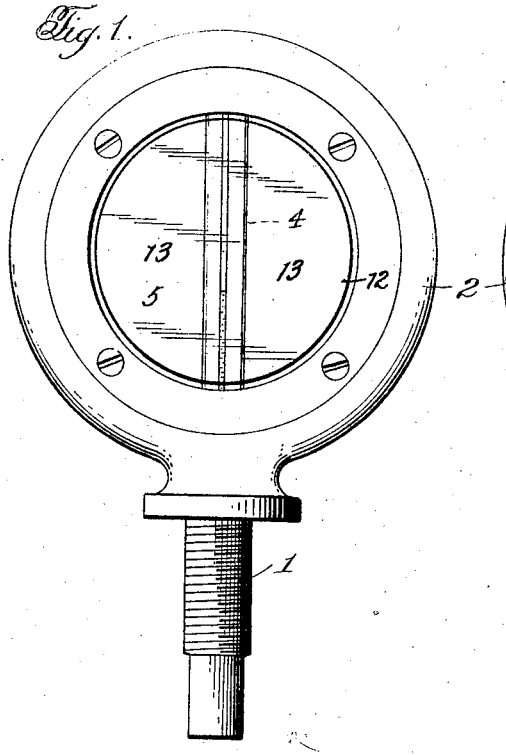
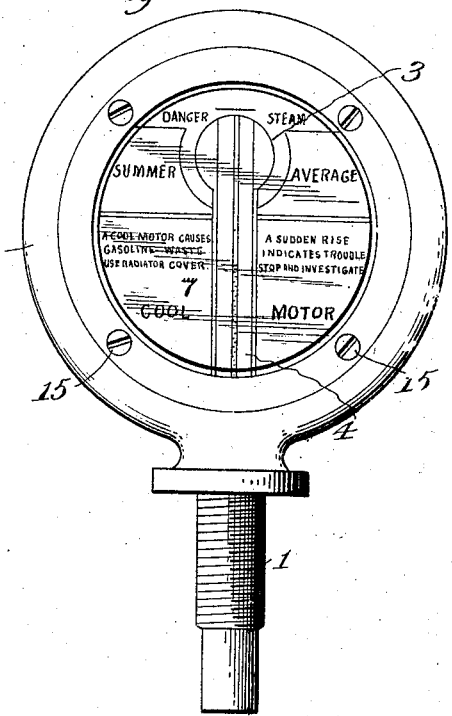
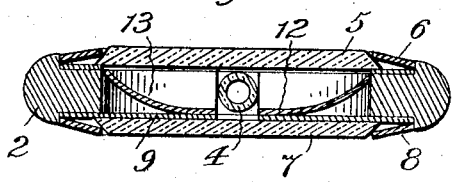
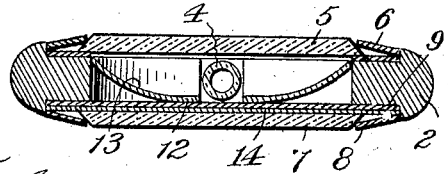
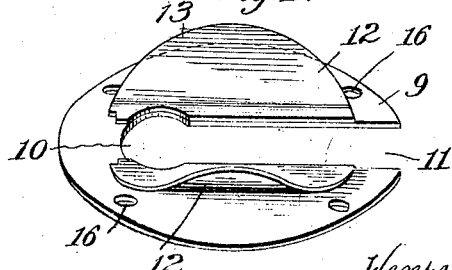

Patented Oct. 18, 1927.

1,645,634

UNITED STATES PATENT OFFICE.

HENRY WATSON WEATHERS, OF AUGUSTA, GEORGIA, ASSIGNOR OF ONE-HALF TO JAMES P. DOUGHTY, JR., TRUSTEE, OF AUGUSTA, GEORGIA.

ATTACHMENT FOR AUTOMOBILE INDICATORS.

Application filed August 28, 1924. Serial No. 734,647.

This invention relates to indicators and while the device has been primarily designed as an attachment to temperature indicators for automobile radiators it may be adapted with equal facility and ease to water level indicators, water and steam gages.

The most commonly used temperature indicator for automobile radiators, now on the market, is what is known as the Boyce "moto-meter". In this instrument the bulb of a thermometer tube is extended into a threaded shank which projects into the filling tube of the radiator and the tube of the thermometer projects up into a casing having a disk with an aperture adjacent its upper end coacting with the expansible fluid in the tube to indicate the danger point. The fluid employed in these thermometers is usually highly colored so as to be clearly visible, but it has been found in practice that while the driver of the machine can inspect the thermometer and determine readily the condition of the water in his radiator during the day time, it is a total impossibility for the driver to ascertain the temperature condition of his motor at night. It is therefore the primary object of this invention to avoid this difficulty and to provide a device which enables the operator of the vehicle to readily see the thermometer tube and the fluid therein, at night.

Devices of this character have been devised heretofore, some of them involving expensive and troublesome lighting systems and others employing prohibitive structures out of the reach of the average automobilist. It is, therefore, another object of the invention to provide a novel attachment which can be conveniently applied to the present Boyce "moto-meter" without in any way modifying any of its parts and which will enable the operator of the vehicle to inspect the indicator and determine accurately the temperature condition of his motor or the level of the water in the radiator in all hours of the day or night.

Another object of the invention is to provide an attachment of this character having reflecting surfaces which will pick up and direct the diffused rays from the headlights of the machine upon which the device is used or the rays from the headlights of an oncoming machine, onto the thermometer tube so that when the automobile is operated at night the driver will be at all times able to determine the temperature of his motor or the level of water in his radiator depending upon whether he is using a temperature indicator or a water lever indicator, the device being equally adaptable to both styles of indicating apparatus.

Another object of the invention is to provide a simple and inexpensive attachment for motor meters or water level indicators which may be installed in the present meters or indicators by the operator of the vehicle without any difficulty and in a very short period of time, which attachment will enable the operator of the vehicle to inspect and make readings at all hours of the day or night.

Further objects of the invention will appear as the following specific description is read in connection with the accompanying drawing, which forms a part of this application, and in which:

Figure 1 is a front elevation of a motor meter equipt with the reflecting attachment;

Figure 2 is a rear elevation of the motor meter as viewed by the driver of the automobile;

Fig. 3 is a horizontal sectional view taken through the indicator;

Figure 4 is a perspective view of the attachment removed from the meter; and

Figure 5 is a sectional view showing a modified arrangement of parts.

The device as illustrated for convenience is shown associated with an ordinary Boyce "moto-meter" which embodies a hollow externally threaded shank 1 which is attached to the filling cap (not shown) and carries at its upper end the circular frame 2. In the Universal type of Boyce "moto-meter" this frame has secured to one side thereof separate disks, provided with registering openings similar to that indicated at 3 in Fig. 2. In the rear of these disks and facing the operator of the vehicle is a thermometer tube of ordinary construction generally indicated at 4 and whose bulb though not shown is located within the stem or shank 1 so as to be readily affected by the water or steam in the radiator. The plates are held in position by lens 5 and a clamping ring 6 and an additional lens 7 and clamping ring 8 are arranged on the rear side of the meter facing the driver. One of the disks has printed upon that surface facing the driver certain indicia which cooperates with the fluid in the thermometer to tell the driver the condition or temperature of the water in the radiator. The other disk facing in the opposite direction sometimes carries advertising indicia such as the name of the automobile. These disks and the structure thus described form no part of my invention except as they are associated with the attachment which I shall now describe.

This attachment comprises a disk 9 having an aperture 10 adjacent one side thereof, and into which merges a radial slot 11 of sufficient width and length with the aperture 10 to expose the thermometer tube 4 from either side of the meter. In other words—this slot makes the tube visible from the front of the machine or from the driver's seat.

Attached to the disk or plate 9 on opposite sides of the aperture 10 and if desirable upon opposite sides of the slot 11 as shown in Fig. 4 are arcuate reflecting plates 12. These plates 12 have their forward faces 13 provided with reflecting surfaces which may be of any character or design best adapted to reflect the most light onto the thermometer tube. I have shown the reflecting surfaces as plain surfaces, but it will be readily understood that they may be corrugated or fluted or constructed in any other manner best suited for the purpose, and while I have shown the plates 12 to be metal plates with reflecting surfaces 13 it is to be understood that these reflectors may be of any other material or the members 12 may be prisms of some suitable character which will deflect the rays of light onto the thermometer tube. The only essential thing to be considered is that these reflecting or light deflecting members 12 be carried by the disk or plate 9 and be insertible into the meter with said disk or plate.

As shown in Figs. 3 and 5 the reflecting plates are curved outwardly from their points of attachment on the plate 9 and are of such size as to closely fit within the frame 2 of the motor meter and if desired they may be made of material having sufficient resiliency to spring into the frame and thereby accommodate themselves to any inaccuracies in the internal diameter of said frames. Whatever arrangement is employed or whatever type of reflecting or deflecting members are used their inner marginal edges will always be flush with the edges of the aperture 10 and slot 11.

Where the device is employed as an attachment to the ordinary Boyce "moto-meter" as shown in Fig. 3 the indicia used on the rear plate of the Boyce "moto-meter" may be printed directly upon the side of the plate 9 which faces the driver and in such instances the lens and clamping ring 8 would directly engage the plate 9 and hold it with its reflecting members 12 in position as shown in Fig. 3. If it is found undesirable to place the indicia upon the plate 9 the attachment can be applied as shown in Fig. 5 and the back plate 14 of the ordinary Boyce "moto-meter" placed over the plate 9 with its reading visible through the lens 7. In such instances the attaching screws 15, which hold the clamping ring 8 in place would pass through both plates 9 and 14 or if desirable the plate 9 may be reduced in diameter and seated in a rabbet formed in the frame 2 as is now employed in the construction of the Universal model of the Boyce "moto-meter". In such instances the screws would only pass through the clamping ring into the frame. I have shown openings 16 in the plate 9 for the passage of the screws 15 where such a construction is desirable, but it will be of course understood as before indicated that these openings may be dispensed with and the attachment made to fit the present day type of motor meter, or water level indicator.

In applying the device to the Boyce "moto-meter" the indicating plates or disks are removed by first taking off the front clamping ring 6 removing the lens 5 and the disks containing the reading matter. The attachment consisting of the plate 9 and its reflecting members 12 is then inserted with the reflecting members directed away from the operator. When employing the device as in Fig. 3 the clamping ring and lens are then secured in position and the motor meter reversed or turned half way around so that the reflecting surfaces 13 face the front of the car and the plate 9 is visible to the driver from the driver's seat. Fig. 3 shows this arrangement of the parts, the tube 4 being visible to the operator through the opening 10 and slot 11.

The same operation is observed in assembling the attachment when the Boyce indicating plate is used as in Fig. 5. In this instance the plate 14 is simply placed over the plate 9 and both held in position by the lens and clamping ring. Where the Boyce plate is employed the person installing the attachment may cut a slot therein corresponding in width and length to the slot 11, or this may be omitted from the operation. In the latter case, however, the thermometer tube would only be visible through the opening 3 which then registers with the opening 10 in the plate 9. The operator would, however, be able to determine any undue rise in temperature, but could not ascertain when his motor was unduly cooled. As a slot can be cut in the Boyce plate 14 with a pair of tinner's shears, the party installing the attachment may make such a slot without any expense or material effort on his part.

It has been found in practice that when my invention is applied to the ordinary automobile temperature or water level indicator and the headlights of the machine are lit that the defused rays from said lights will be reflected by the members 12 onto the tube 4 illuminating the same sufficiently to enable the driver to make readings at all times.

What I claim is:

1. An attachment for indicators of automobiles comprising a mounting plate having means for attachment to the indicator and means supported thereby for directing the incident rays from automobile lights onto the indicating element.

2. An attachment for automobile indicators comprising an apertured plate having means for attachment to the indicator, and a reflecting member carried thereby adapted to reflect light across said aperture so as to increase the visibility of the indicating element.

3. An attachment for automobile indicators comprising an apertured plate having means for attachment to the indicator and reflecting members attached to said plate for reflecting light across said aperture in opposite directions so as to increase the visibility of the indicating element.

4. An attachment for automobile indicators comprising an apertured plate having means for attachment to the indicator and reflecting members attached to the plate on opposite sides of said aperture for reflecting light across said aperture so as to increase the visibility of the indicating element.

5. An attachment for automobile indicators comprising an apertured and slotted plate having means for attachment to the indicator and a reflecting member attached thereto and arranged for reflecting light across said aperture and slot so as to increase the visibility of the indicating element.

6. In combination with an automobile motor meter having an open frame, an indicating element therein, and lens clamping members, of an attachment secured in said frame by said members and comprising a mounting plate and reflecting members carried thereby arranged to reflect the rays from the automobile lights onto the indicating element.

7. In combination with an automobile motor meter having an open frame, an indicating element therein, and lens clamping members, of an attachment secured in said frame by said members and comprising a slotted mounting plate through which the indicating element is visible, and a reflecting member supported by the plate and arranged to reflect the rays from the automobile lights across the slot in said plate and onto the indicating element.

8. In combination with an automobile motor meter having an open frame, an indicating element therein, and lens clamping members, of an attachment secured in said frame by said members and comprising a slotted mounting plate through which the indicating element is visible, and reflecting members carried by said plate and fitting into the frame, said members arranged to reflect the rays from the automobile lights onto the indicating element.

In testimony whereof I affix my signature.

HENRY WATSON WEATHERS.